(12) United States Patent
Son et al.

(10) Patent No.: US 11,902,210 B2
(45) Date of Patent: Feb. 13, 2024

(54) METHOD AND APPARATUS FOR TRANSMITTING AND RECEIVING HARQ RESPONSE IN COMMUNICATION SYSTEM

(71) Applicants: Hyundai Motor Company, Seoul (KR); Kia Motors Corporation, Seoul (KR)

(72) Inventors: Hyuk Min Son, Jeollabuk-do (KR); Gene Back Hahn, Gyeonggi-do (KR); In Yong Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 76 days.

(21) Appl. No.: 17/259,746

(22) PCT Filed: Oct. 8, 2020

(86) PCT No.: PCT/KR2020/013808
§ 371 (c)(1),
(2) Date: Jan. 12, 2021

(87) PCT Pub. No.: WO2021/091099
PCT Pub. Date: May 14, 2021

(65) Prior Publication Data
US 2022/0368502 A1 Nov. 17, 2022

Related U.S. Application Data

(60) Provisional application No. 62/933,044, filed on Nov. 8, 2019.

(51) Int. Cl.
*H04L 5/00* (2006.01)
*H04L 1/18* (2023.01)
*H04L 1/1812* (2023.01)

(52) U.S. Cl.
CPC .......... *H04L 5/0055* (2013.01); *H04L 1/1812* (2013.01)

(58) Field of Classification Search
CPC ... H04W 28/04; H04W 72/04; H04W 72/042; H04W 88/08; H04L 5/0007; H04L 5/0055; H04L 1/1812
(Continued)

(56) References Cited

U.S. PATENT DOCUMENTS 11,627,556 B2 * 4/2023 Lee .................. H04W 72/0446
370/329
11,632,220 B2 * 4/2023 Park ..................... H04L 5/0055
370/329

(Continued)

FOREIGN PATENT DOCUMENTS

CN WO 2021/028016 A1 * 2/2021 ............... H04L 1/18
CN 4 021 124 A1 * 6/2022 ............ H04W 72/12
(Continued)

OTHER PUBLICATIONS

3GPP TSG RAN WG1 Meeting #95, Spokane, USA, Nov. 12-16, 2018, Agenda item: 7.2.4.1.5, Source: Fujitsu, Title: Considerations on HARQ-ACK feedback for NR-V2X unicast. (Year: 2018).*
(Continued)

*Primary Examiner* — Mohammad S Anwar
*Assistant Examiner* — Sanjay K Dewan
(74) *Attorney, Agent, or Firm* — Fox Rothschild LLP

(57) ABSTRACT

A method and an apparatus for transmitting and receiving HARQ responses in a communication system are provided. An operation method of a first terminal in a communication system includes receiving configuration information including a first information element indicating a type of a hybrid automatic repeat request-acknowledgment (HARQ-ACK) codebook from a base station and generating the HARQ-
(Continued)

ACK codebook including a downlink (DL) HARQ information bit for downlink communication between the base station and the first terminal and a sidelink (SL) HARQ information bit for sidelink communication between the first terminal and a second terminal. The HARQ-ACK codebook is transmitted to the base station using an uplink channel.

20 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2010/0208679 | A1* | 8/2010 | Papasakellariou | H04W 72/21 370/329 |
| 2020/0037343 | A1* | 1/2020 | He | H04W 28/0268 |
| 2020/0275476 | A1* | 8/2020 | Yang | H04L 5/0055 |
| 2021/0021382 | A1* | 1/2021 | Chien | H04W 72/23 |
| 2021/0050950 | A1* | 2/2021 | Zhou | H04W 76/14 |
| 2021/0050953 | A1* | 2/2021 | Park | H04L 1/1864 |
| 2021/0051652 | A1* | 2/2021 | Khoshnevisan | H04L 5/0055 |
| 2021/0051704 | A1* | 2/2021 | Yang | H04W 72/20 |
| 2021/0144688 | A1* | 5/2021 | Lin | H04W 72/23 |
| 2021/0160879 | A1* | 5/2021 | Lin | H04L 1/0003 |
| 2022/0140951 | A1* | 5/2022 | He | H04L 1/0061 370/329 |
| 2022/0279545 | A1* | 9/2022 | Yoshioka | H04W 76/15 |
| 2022/0353915 | A1* | 11/2022 | Liu | H04W 74/0808 |
| 2022/0400531 | A1* | 12/2022 | Back | H04W 76/28 |
| 2023/0039107 | A1* | 2/2023 | Liu | H04L 1/1642 |
| 2023/0087225 | A1* | 3/2023 | Ryu | H04L 1/1893 370/329 |
| 2023/0106098 | A1* | 4/2023 | Wang | H04W 72/0453 370/329 |
| 2023/0114310 | A1* | 4/2023 | Xu | H04L 1/189 370/329 |
| 2023/0115228 | A1* | 4/2023 | Zhou | H04L 1/1812 370/329 |

FOREIGN PATENT DOCUMENTS

| | | | | |
|---|---|---|---|---|
| EP | 3 884 605 B1 * | 5/2023 | ........... | H04L 1/1854 |
| JP | 4 114 110 A1 * | 1/2023 | ........... | H04W 4/40 |
| SE | WO 2020/226547 A1 * | 11/2020 | ........... | H04L 5/00 |
| SE | WO 2021/024121 A1 * | 2/2021 | ........... | H04L 5/00 |
| SE | WO 2021/033116 A1 * | 2/2021 | ........... | H04L 1/18 |
| WO | WO 2019/139908 A1 * | 7/2019 | ........... | H04W 24/04 |

OTHER PUBLICATIONS

English translation of PCT Written Opinion of the International Searching Authority. (Year: 2021).*
"Discussion on mode-1 resource allocation for NR sidelink", R1-1910163, 3GPP TSG RAN WG1 #98bis, Chongqing, China, Oct. 14-20, 2019, 4 pages.
"Uu-based sidelink resoure allocation", R1-191053, 3GPP TSG-RAN WG1 Meeting #98bis, Chongqing, China, Oct. 14-20, 2019, 23 pages.
"Resource allocation mode-1 for NR V2X sidelink communication", R1-1910649, GPP TSG RAN WG1 Meeting #98bis, Chongqing, China, Oct. 14-20, 2019, 8 pages.

* cited by examiner

METHOD AND APPARATUS FOR TRANSMITTING AND RECEIVING HARQ RESPONSE IN COMMUNICATION SYSTEM

CROSS-REFERENCE TO RELATED APPLICATIONS

This application is a National Phase application filed under 35 USC 371 of PCT International Application No. PCT/KR2020/013808 with an International Filing Date of Oct. 8, 2020, which claims the benefit of U.S. Provisional Application 62/933,044 filed on Nov. 8, 2019, the entire contents of which are incorporated herein.

TECHNICAL FIELD

The present disclosure relates to a sidelink communication technique, and more specifically, to a technique for transmitting and receiving a hybrid automatic repeat request (HARQ) response for sidelink data in a communication system.

BACKGROUND

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system are capable of supporting Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. The sidelink communication may be performed using configured grant (CG) resources. The CG resources may be configured periodically, and periodic data (e.g., periodic sidelink data) may be transmitted using the CG resources.

Meanwhile, the sidelink communication may be performed in a broadcast scheme, a multicast scheme, a groupcast scheme, or a unicast scheme. When the unicast scheme is used, a feedback procedure for a hybrid automatic repeat request (HARQ) response to sidelink data may be required.

SUMMARY

An objective of the present disclosure for solving the above-described problem is to provide a method and an apparatus for transmitting and receiving a hybrid automatic repeat request (HARQ) response for sidelink data in a communication system.

An operation method of a first communication node, according to a first exemplary embodiment of the present disclosure for achieving the objective, may include: receiving configuration information including a first information element indicating a type of an HARQ-ACK codebook from a base station; generating the HARQ-ACK codebook including a DL HARQ information bit for downlink communication between the base station and the first terminal and an SL HARQ information bit for sidelink communication between the first terminal and a second terminal; and transmitting the HARQ-ACK codebook to the base station using an uplink channel, wherein the HARQ-ACK codebook transmitted to the base station has the type indicated by the first information element.

The type indicated by the first information element may be a type of an HARQ-ACK codebook for the downlink communication, and a type of an HARQ-ACK codebook for the sidelink communication may be equal to the type indicated by the first information element. The DL HARQ information bit may be an HARQ response for DL data transmitted through a first carrier, and the SL HARQ information bit may be an HARQ response for SL data transmitted via a second carrier. A transmission time unit of DL data related to the DL HARQ information bit may be different from a transmission time unit of SL data related to the SL HARQ information bit.

The configuration information may further include a second information element indicating whether the SL HARQ information bit is multiplexed in the uplink channel. The configuration information may further include a third information element indicating an HARQ feedback scheme. The uplink channel may be a PUCCH or a PUSCH.

The HARQ-ACK codebook may be generated in units of a transmission interval composed of a plurality of slots, and the HARQ-ACK codebook may include a first DL HARQ information bit for first DL data received through a first carrier in a first slot among the plurality of slots, a first SL HARQ information bit for first SL data transmitted via a second carrier in the first slot, a second DL HARQ information bit for second DL data received via the first carrier in a second slot among the plurality of slots, and a second SL HARQ information bit for second SL data transmitted via the second carrier in the second slot.

An operation method of a base station, according to a second exemplary embodiment of the present disclosure for achieving the objective, may include: transmitting, to a first terminal, configuration information including a first information element indicating a type of an HARQ-ACK codebook; transmitting at least one DL data to the first terminal via a downlink channel; and receiving, from the first terminal, the HARQ-ACK codebook including at least one DL HARQ information bit for the at least one DL data and at least one SL HARQ information bit for sidelink communication between the first terminal and a second terminal through an uplink channel, wherein the HARQ-ACK codebook received from the first terminal has the type indicated by the first information element, and the type is classified into a semi-static type and a dynamic type.

The type indicated by the first information element may be a type of an HARQ-ACK codebook for downlink communication between the base station and the first terminal, and a type of an HARQ-ACK codebook for the sidelink communication may be equal to the type indicated by the first information element. The at least one DL data may be transmitted to the first terminal via a first carrier, and at least one SL data related to the at least one SL HARQ information bit may be transmitted from the first terminal to the second terminal via a second carrier.

The configuration information may further include a second information element indicating whether the at least one SL HARQ information bit is multiplexed in the uplink channel. The configuration information may further include a third information element indicating an HARQ feedback scheme. The uplink channel may be a PUCCH or a PUSCH.

The HARQ-ACK codebook may be generated in units of a transmission interval composed of a plurality of slots, and the HARQ-ACK codebook may include a first DL HARQ information bit for first DL data transmitted via a first carrier in a first slot among the plurality of slots, a first SL HARQ information bit for first SL data transmitted via a second carrier in the first slot, a second DL HARQ information bit for second DL data transmitted via the first carrier in a second slot among the plurality of slots, and a second DL HARQ information bit for second DL data transmitted via the second carrier in the second slot.

A first terminal, according to a third exemplary embodiment of the present disclosure for achieving the objective, may include a processor; and a memory configured to store at least one instruction executed by the processor. When executed by the processor, the at least one instruction may cause the first terminal to: receive configuration information including a first information element indicating a type of an HARQ-ACK codebook from a base station; generate the HARQ-ACK codebook including at least one DL HARQ information bit for downlink communication between the base station and the first terminal and at least one SL HARQ information bit for sidelink communication between the first terminal and a second terminal; and transmit the HARQ-ACK codebook to the base station using an uplink channel, wherein the HARQ-ACK codebook transmitted to the base station has the type indicated by the first information element, and the type is classified into a semi-static type and a dynamic type.

The type indicated by the first information element may be a type of an HARQ-ACK codebook for downlink communication between the base station and the first terminal, and a type of an HARQ-ACK codebook for the sidelink communication may be equal to the type indicated by the first information element. The at least one DL HARQ information bit may be at least one HARQ response for at least one DL data transmitted via a first carrier, and the at least one SL HARQ information bit may be at least one HARQ response for at least one SL data transmitted via a second carrier.

The configuration information may further include a second information element indicating whether the at least one SL HARQ information bit is multiplexed in the uplink channel and a third information element indicating an HARQ feedback scheme, the third information element set to a first value may indicate that a negative ACK (NACK)-only feedback scheme is used, and the third information element set to a second value may indicate that an ACK/NACK feedback scheme is used.

The HARQ-ACK codebook may be generated in units of a transmission interval composed of a plurality of slots, and the HARQ-ACK codebook may include a first DL HARQ information bit for first DL data received via a first carrier in a first slot among the plurality of slots, a first SL HARQ information bit for first SL data transmitted via a second carrier in the first slot, a second DL HARQ information bit for second DL data received via the first carrier in a second slot among the plurality of slots, and a second SL HARQ information bit for second SL data transmitted via the second carrier in the second slot.

According to the present disclosure, the terminal may generate an HARQ-ACK codebook including DL HARQ information bits and SL HARQ information bits, and transmit the HARQ-ACK codebook to the base station. Further, the type of the codebook associated with the SL HARQ information bits may be regarded as the same as the type of the codebook associated with the DL HARQ information bits. Therefore, the HARQ-ACK codebook may be transmitted efficiently, and the performance of the communication system may be improved.

DETAILED DESCRIPTION

Figure 1:
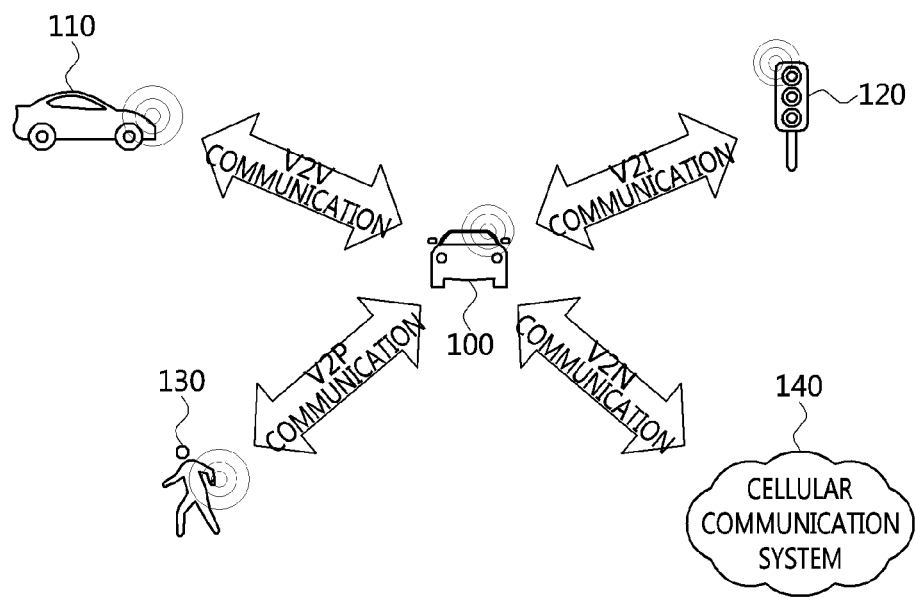
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located in the vehicle 100 or the communication node carried by the person 130 may generate an alarm indicating a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Figure 2:
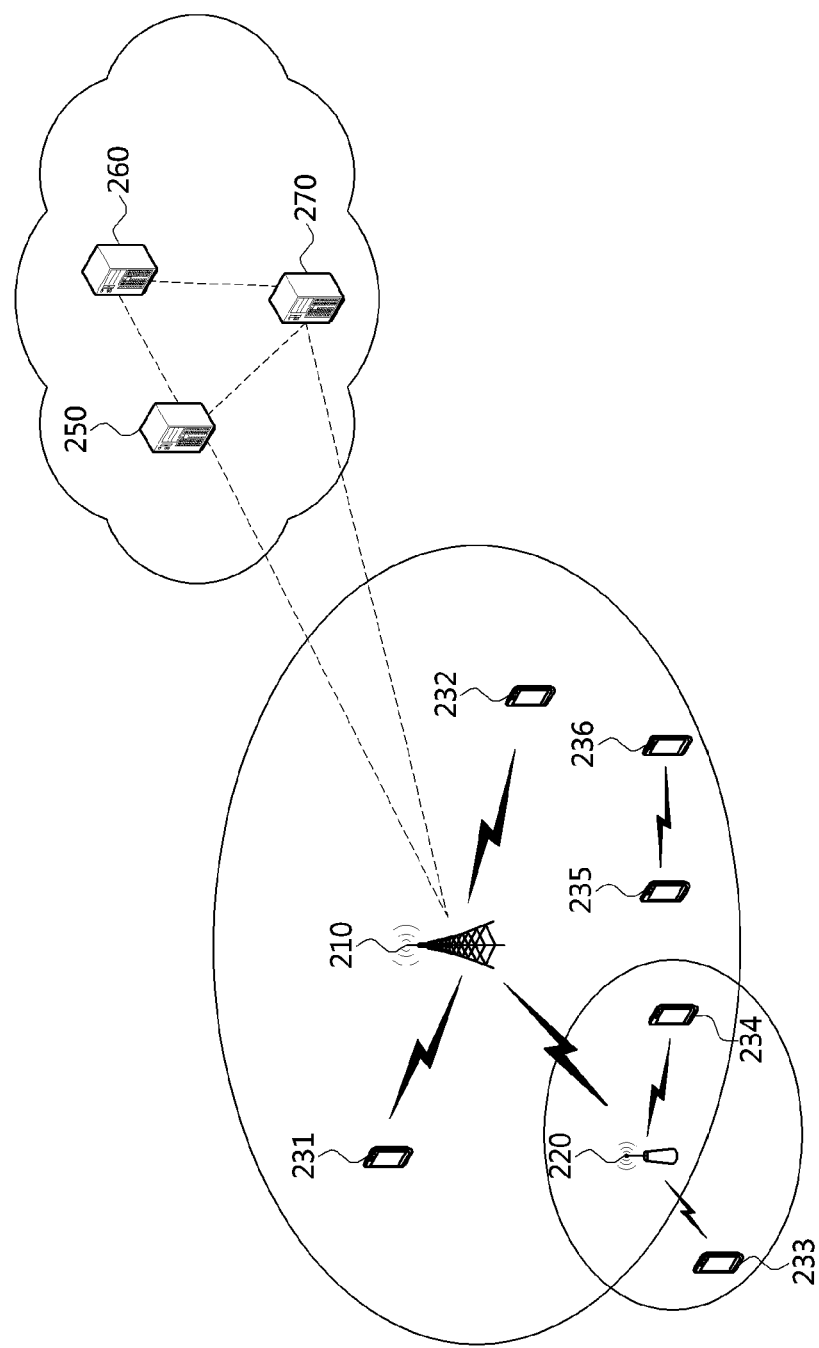
FIG. 2 is a conceptual diagram illustrating an exemplary embodiment of a cellular communication system.

Meanwhile, the cellular communication system 140 supporting the V2X communications may be configured as follows. FIG. 2 is a conceptual diagram illustrating an exemplary embodiment of a cellular communication system. As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported via the V2X network slice configured in the core network.

The communication nodes (e.g., base station, relay, UE, S-GW, P-GW, MME, UPF, SMF, AMF, etc.) including the cellular communication system may perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

Figure 3:
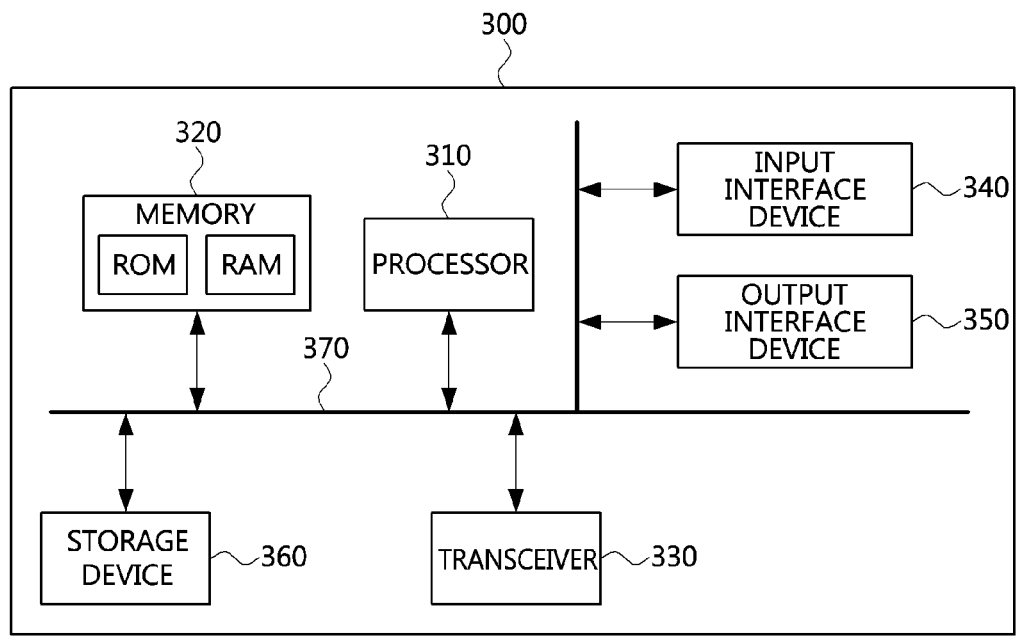
FIG. 3 is a conceptual diagram illustrating an exemplary embodiment of a communication node constituting a cellular communication system.

The communication nodes (e.g., base station, relay, UE, S-GW, P-GW, MME, UPF, SMF, AMF, etc.) including the cellular communication system may be configured as follows. FIG. 3 is a conceptual diagram illustrating an exemplary embodiment of a communication node forming a cellular communication system.

As shown in FIG. 3, a communication node 300 may include at least one processor 310, a memory 320, and a transceiver 330 connected to a network for performing communications. In addition, the communication node 300 may further include an input interface device 340, an output interface device 350, a storage device 360, and the like. Each component included in the communication node 300 may communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. In other words, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
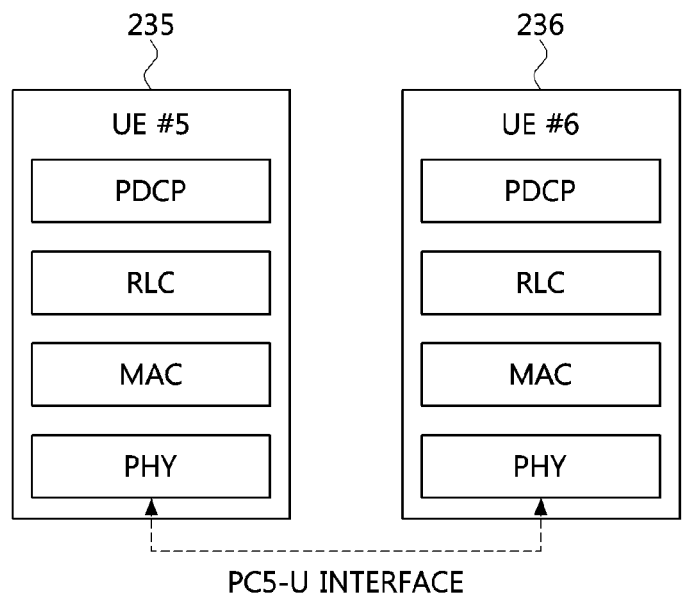
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported.

Figure 5:
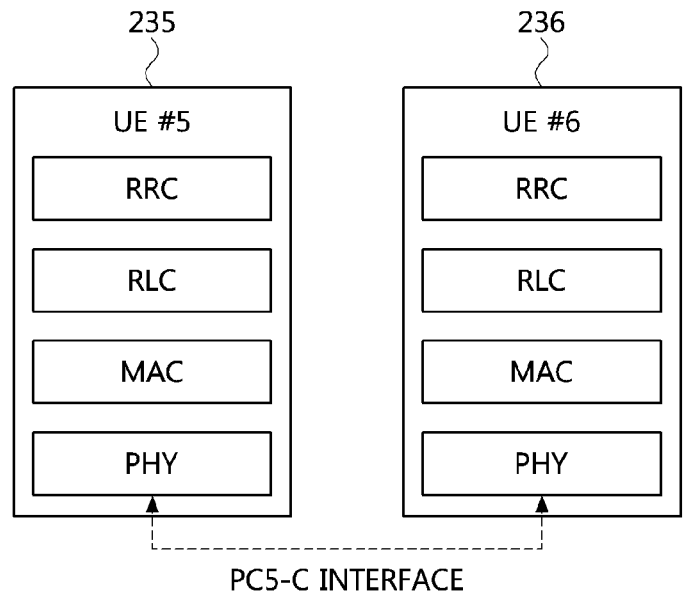
FIG. 5 is a block diagram illustrating a first exemplary embodiment of a control plane protocol stack of a UE performing sidelink communication.

Meanwhile, a control plane protocol stack of the UEs (e.g., the UEs 235 and 236) performing sidelink communications may be configured as follows. FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

Figure 6:
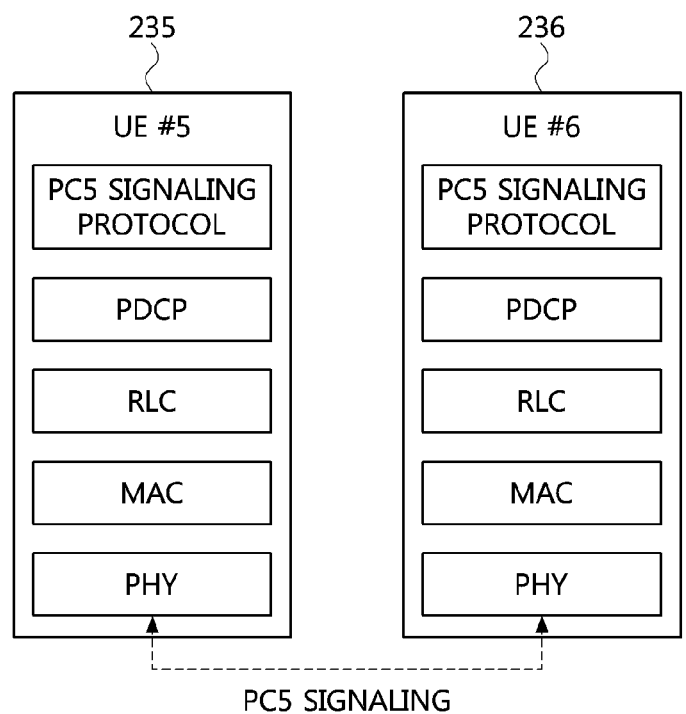
FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Additionally, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In particular, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. Particularly, the sidelink control information may be transmitted via resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received via resources selected autonomously by the UE (e.g., UE 235 or 236) within the resource pool configured by the dedicated RRC signaling procedure or the broadcast RRC signaling procedure.

Hereinafter, methods for transmitting and receiving hybrid automatic repeat request (HARQ) responses for sidelink data (e.g., transport block (TB), code block group (CBG)) will be described. In the exemplary embodiments, an HARQ response may be referred to as 'HARQ-acknowledgment (HARQ-ACK)'. The HARQ response may be ACK or negative ACK (NACK). Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for the higher layer signaling may be referred to as a 'higher layer message' or a 'higher layer signaling message'. A message used for the MAC signaling may be referred to as a 'MAC message' or a 'MAC signaling message'. A message used for the PHY signaling may be referred to as a 'PHY message' or a 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single SCI scheme or a multi SCI scheme. When the single SCI scheme is used, data transmission (e.g., sidelink data transmission, sidelink-shared channel (SL-SCH) transmission) may be performed based on a single SCI (e.g., 1st-stage SCI). When the multi SCI scheme is used, data transmission may be performed using two SCIs (e.g., 1st-stage SCI and 2nd-stage SCI). The SCI may be transmitted through a PSCCH and/or a PSSCH. When the single SCI scheme is used, the SCI (e.g., 1st-stage SCI) may be transmitted via a PSCCH. When the multi SCI scheme is used, the 1st-stage SCI may be transmitted via a PSCCH, and the 2nd-stage SCI may be transmitted via a PSCCH or a PSSCH. The 1st-stage SCI may be referred to as a 'first stage SCI', and the 2nd-stage SCI may be referred to as a 'second stage SCI'.

The first stage SCI may include one or more information elements among priority information, frequency resource assignment information, time resource assignment information, resource reservation period information, DMRS pattern information, second stage SCI format information, beta_offset indicator, number of DMRS ports, and modulation and coding scheme (MCS) information. The second stage SCI may include one or more information elements among a HARQ process identifier (ID), redundancy version (RV), source ID, destination ID, CSI request information, zone ID, and communication range requirement.

Meanwhile, for sidelink communication, an HARQ feedback operation may be supported, and a sidelink retransmission operation may be performed according to an HARQ feedback. The HARQ feedback operation for sidelink communication (hereinafter referred to as 'SL HARQ feedback operation') may be performed based on two schemes. In the first scheme for the SL HARQ feedback operation, all terminals participating in sidelink communication (e.g., groupcast sidelink communication) may share a PSFCH resource, and transmit only NACK using the shared PSFCH resource. The first scheme for the SL HARQ feedback operation may be a 'NACK-only' feedback scheme.

In the second scheme for the SL HARQ feedback operation, a PSFCH resource may be independently allocated to each of the terminals, and each terminal may transmit ACK or NACK using the allocated PSFCH resource. The second scheme for the SL HARQ feedback operation may be an 'ACK/NACK' feedback scheme. Alternatively, the SL HARQ feedback operation may be performed based on a combination of the above two schemes or another scheme. The PSFCH may have a sequence-based format.

When the SL HARQ feedback operation is supported, a first terminal may transmit sidelink data to a second terminal, and receive an HARQ response (hereinafter referred to as 'SL HARQ response') for the sidelink data from the second terminal. The SL HARQ response may be transmitted from the second terminal to the first terminal via a PSFCH, PUCCH, or PUSCH. The first terminal may transmit the SL HARQ response received from the second terminal to a base station via a PUCCH or PUSCH. When the SL HARQ response is transmitted via a PUCCH, the SL HARQ response may be multiplexed with uplink control information in the PUCCH. When the SL HARQ response is transmitted via a PUSCH, the SL HARQ response may be multiplexed with uplink control information and/or uplink data in the PUSCH. The uplink control information may include an HARQ response (hereinafter referred to as 'DL HARQ response') for downlink data, channel state information (CSI), and/or scheduling request (SR).

The HARQ response (e.g., SL HARQ response and/or DL HARQ response) may be a type-1 HARQ-ACK codebook or a type-2 HARQ-ACK codebook. When a semi-static scheme is used as a scheduling scheme, the type-1 HARQ-ACK codebook may be used. When a dynamic scheme is used as the scheduling scheme, the type-2 HARQ-ACK codebook may be used. In exemplary embodiments, an HARQ-ACK codebook may refer to the type-1 HARQ-ACK codebook or the type-2 HARQ-ACK codebook. The HARQ-ACK codebook may include one or more HARQ information bits. One HARQ information bit may indicate ACK or NACK for one TB. Alternatively, one HARQ information bit may indicate ACK or NACK for one CBG.

When sidelink communication is performed using a plurality of carriers (e.g., component carriers), the HARQ-ACK codebook may include HARQ information bit(s) for data (e.g., one or more TBs or one or more CBGs) transmitted in each of the plurality of carriers. For example, the HARQ-ACK codebook may include HARQ information bit(s) for a first carrier and HARQ information bit(s) for a second carrier. The first carrier may be used for downlink communication, and the second carrier may be used for sidelink communication. In this case, the HARQ information bit for the first carrier may be a DL HARQ response, and the HARQ information bit for the second carrier may be an SL HARQ response.

Figure 7:
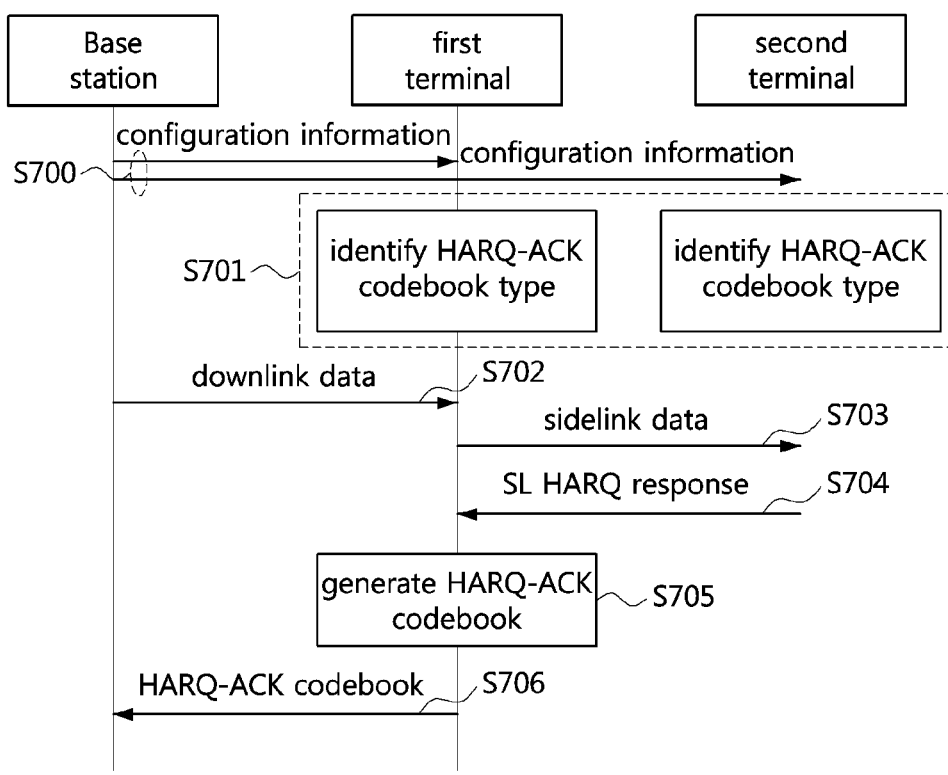
FIG. 7 is a sequence chart illustrating a first exemplary embodiment of a method of transmitting and receiving an HARQ response in a communication system.

FIG. 7 is a sequence chart illustrating a first exemplary embodiment of a method of transmitting and receiving an HARQ response in a communication system. As shown in FIG. 7, a communication system may include a base station, a first terminal, and a second terminal. The base station may be the base station 210 shown in FIG. 2, the first terminal may be the UE #5 235 shown in FIG. 2, and the second terminal may be the UE #6 236 shown in FIG. 2. The first terminal and the second terminal may be located within the coverage of the base station. Alternatively, the second terminal may be located outside the coverage of the base station. Downlink communication and/or uplink communication may be performed between the base station and the first terminal. Sidelink communication may be performed between the first terminal and the second terminal. Each of the base station, the first terminal, and the second terminal may be configured to be the same as or similar to the communication node 300 shown in FIG. 3. Each of the first terminal and the second terminal may support the protocol stacks shown in FIGS. 4 to 6.

The base station may generate configuration information and transmit a higher layer message including the configuration information (S700). Alternatively, the configuration information may be transmitted using a MAC message and/or a PHY message. The configuration information may include an information element indicating a type of an HARQ-ACK codebook (hereinafter, 'codebook type information element'). The codebook type information element may be pdsch-HARQ-ACK-Codebook. The pdsch-HARQ-ACK-Codebook may indicate the type-1 HARQ-ACK codebook or the type-2 HARQ-ACK codebook. In other words, the pdsch-HARQ-ACK-Codebook may indicate whether a physical downlink shared channel (PDSCH) HARQ-ACK codebook is semi-static or dynamic.

In addition, the configuration information may further include an information element indicating that the type of the HARQ-ACK codebook indicated by the pdsch-HARQ-ACK-Codebook is applied to a PSSCH HARQ-ACK codebook (e.g., SL HARQ-ACK codebook). That is, the type of the PSSCH HARQ-ACK codebook may be indicated to be the same as the type of the PDSCH HARQ-ACK codebook.

The configuration information may include an information element (hereinafter, 'SL multiplexing information element') indicating whether the SL HARQ response is multiplexed in an uplink channel (e.g., PUCCH or PUSCH). The SL multiplexing information element set to a first value may indicate that the SL HARQ response is multiplexed in an uplink channel. The SL multiplexing information element set to a second value may indicate that the SL HARQ response is not multiplexed in an uplink channel.

Further, the configuration information may include an information element indicating a HARQ feedback scheme (hereinafter referred to as 'feedback scheme information element'). The feedback scheme information element set to a first value may indicate that the ACK/NACK feedback scheme is used. The feedback method information element set to a second value may indicate that the NACK-only feedback scheme is used.

The first terminal may receive the configuration information from the base station, and may identify the information element(s) (e.g., codebook type information element, SL multiplexing information element, and/or feedback scheme information element) included in the configuration information. When the codebook type information element indicates the type-1 HARQ-ACK codebook (e.g., semi-static signaling), the first terminal may determine that the type-1 HARQ-ACK codebook is used for DL HARQ response, and may consider that the type-1 HARQ-ACK codebook (e.g., HARQ-ACK codebook having the same type as DL HARQ response) is used for SL HARQ response (S701).

Alternatively, when the codebook type information element indicates the type-2 HARQ-ACK codebook (e.g., dynamic signaling), the first terminal may determine that the type-2 HARQ-ACK codebook is used for DL HARQ response, and may consider that the type-2 HARQ-ACK codebook (e.g., HARQ-ACK codebook having the same type as DL HARQ response) is used for SL HARQ response (S701).

In other words, the first terminal may determine that the same type of HARQ-ACK codebook is used for DL HARQ response and SL HARQ response. In addition, the first terminal may identify whether the SL HARQ response is multiplexed in an uplink channel based on the SL multiplexing information element. When the SL HARQ response is multiplexed in an uplink channel, the first terminal may consider that the type of the HARQ-ACK codebook for the SL HARQ response is the same as the type of the HARQ-ACK codebook for DL HARQ response associated with the uplink channel (e.g., DL HARQ response transmitted through the uplink channel). In addition, the first terminal may identify whether the ACK/NACK feedback scheme or the NACK-only feedback scheme is used based on the feedback scheme information element.

The second terminal may receive the configuration information from the base station, and may identify the information element(s) (e.g., codebook type information element, SL multiplexing information element, and/or feedback scheme information element) included in the configuration information. When the codebook type information element indicates the type-1 HARQ-ACK codebook, the second terminal may determine that the type-1 HARQ-ACK codebook is used for the DL HARQ response, and may consider that the type-1 HARQ-ACK codebook (e.g., HARQ-ACK codebook of the same type as the DL HARQ response) is used for the SL HARQ response (S701). Alternatively, when the codebook type information element indicates the type-2 HARQ-ACK codebook, the second terminal may determine that the type-2 HARQ-ACK codebook is used for the DL HARQ response, and may consider that the type-2 HARQ-ACK codebook (e.g., HARQ-ACK codebook of the same type as the DL HARQ response) is used for the SL HARQ response (S701).

In other words, the second terminal may determine that the same type of HARQ-ACK codebook is used for DL HARQ response and SL HARQ response. In addition, the second terminal may identify whether the SL HARQ response is multiplexed in an uplink channel based on the SL multiplexing information element. When the SL HARQ response is multiplexed in an uplink channel, the second terminal may consider that the type of the HARQ-ACK codebook for the SL HARQ response is the same as the type of the HARQ-ACK codebook for the DL HARQ response associated with the uplink channel (e.g., DL HARQ response transmitted through the uplink channel). In addition, the second terminal may identify whether the ACK/NACK feedback scheme or the NACK-only feedback scheme is used based on the feedback scheme information element.

Meanwhile, the base station may transmit downlink data (e.g., one or more TBs or one or more CBGs) to the first terminal through a PDSCH (e.g., PDSCH resource) (S702).

In the step S702, the downlink data may be transmitted via a first carrier (e.g., a first component carrier (CC)). Alternatively, in the step S702, the downlink data may be transmitted via a plurality of carriers (e.g., a first carrier and a second carrier). The downlink data may be transmitted via a resource allocated by a semi-static scheduling scheme (e.g., resource allocated by a semi-persistent scheduling (SPS) or a configured grant (CG)) or a resource allocated by a dynamic signaling scheme (e.g., resource allocated by downlink control information (DCI)). The first terminal may perform a monitoring operation on the resource allocated by the base station to obtain the downlink data, and may perform a decoding operation on the downlink data. The first terminal may generate a DL HARQ response as a result of the decoding.

In addition, the first terminal may transmit sidelink data (e.g., one or more TBs or one or more CBGs) through a PSSCH (e.g., PSSCH resource) (S703). In the step S703, the sidelink data may be transmitted via a carrier (e.g., the second carrier or a third carrier) different from the first carrier (e.g., carrier used for transmission and reception of the downlink data). The carrier used for sidelink communication may be configured by the base station. The resource through which the sidelink data is transmitted may belong to a resource pool configured by the base station. The sidelink data may be transmitted in a resource allocated by a semi-static scheduling scheme or a resource allocated by a dynamic signaling scheme (e.g., resource allocated by SCI). The step S703 may be performed after or before the step S702. Alternatively, the step S703 may be performed simultaneously with the step S702.

The second terminal may perform a monitoring operation to obtain the sidelink data, and may perform a decoding operation on the sidelink data. The second terminal may transmit an SL HARQ response as a result of the decoding to the first terminal (S704). The SL HARQ response may be transmitted via a PSFCH, PUSCH, or PUCCH. The step S704 may be performed based on the configuration information (e.g., codebook type information element, SL multiplexing information element, and/or feedback scheme information element) received from the base station. For example, the SL HARQ response may be the type-1 HARQ-ACK codebook or the type-2 HARQ ACK codebook. The SL HARQ response may be multiplexed in an uplink channel. The SL HARQ response may be transmitted according to the ACK/NACK feedback scheme or the NACK-only feedback scheme.

The first terminal may receive the SL HARQ response from the second terminal. The first terminal may generate an HARQ-ACK codebook including the DL HARQ response and the SL HARQ response (S705). For example, the first terminal may determine the type of the HARQ-ACK codebook (e.g., type-1 HARQ-ACK codebook or type-2 HARQ-ACK codebook) based on the codebook type information element received from the base station. The first terminal may determine the type of the HARQ-ACK codebook for the PDSCH, and may consider that the type of the HARQ-ACK codebook for the PSSCH is the same as the type of the HARQ-ACK codebook for the PDSCH. In addition, the first terminal may determine an uplink channel (e.g., PUCCH or PUSCH) through which the HARQ-ACK codebook is transmitted.

The first terminal may generate the HARQ-ACK codebook in units of a transmission interval. The transmission interval may include one or more slots (or one or more mini-slots). When data is transmitted using a plurality of carriers in one transmission interval, one HARQ-ACK codebook may include HARQ information bits (hereinafter referred to as 'HIBs') for the data transmitted through the plurality of carriers. When the ACK/NACK feedback scheme is used, the HIB may indicate ACK or NACK. When the NACK-only feedback scheme is used, the HIB may indicate NACK.

For example, when one transmission interval includes n slots, data is transmitted using m carriers in one transmission interval, and data transmitted via one carrier is j TBs or k CBGs, the HARQ-ACK codebook may be generated as shown in Table 3 below. Each of n, m, j, and k may be a natural number. When a plurality of carriers are used for data transmission, the plurality of carriers may include a carrier for downlink communication and a carrier for sidelink communication. In Table 3 below, a rule for generating the HARQ-ACK codebook may be predefined in the base station and the terminals.

TABLE 3

|  | Slot #0 | | ... | Slot #n-1 | |
|---|---|---|---|---|---|
|  | Carrier #0 | ... Carrier #m-1 | ... Carrier #0 | ... Carrier #m-1 | |
| HARQ-ACK codebook (1TB or 1CBG) | HIB | ... HIB | ... HIB | ... HIB | |
| HARQ-ACK codebook (2TB or 2CBG) | HIB HIB | ... HIB HIB | ... HIB HIB | ... HIB HIB | |

The first terminal may transmit the HARQ-ACK codebook to the base station using an uplink channel (e.g., PUCCH or PUSCH) (S706). The base station may receive the HARQ-ACK codebook from the first terminal, and based on the HIBs included in the HARQ-ACK codebook, the base station may identify reception states (e.g., ACK or NACK) of the downlink data and/or the sidelink data. Meanwhile, in the step S705 described above, the HARQ-ACK codebook may be generated based on various schemes.

Figure 8:
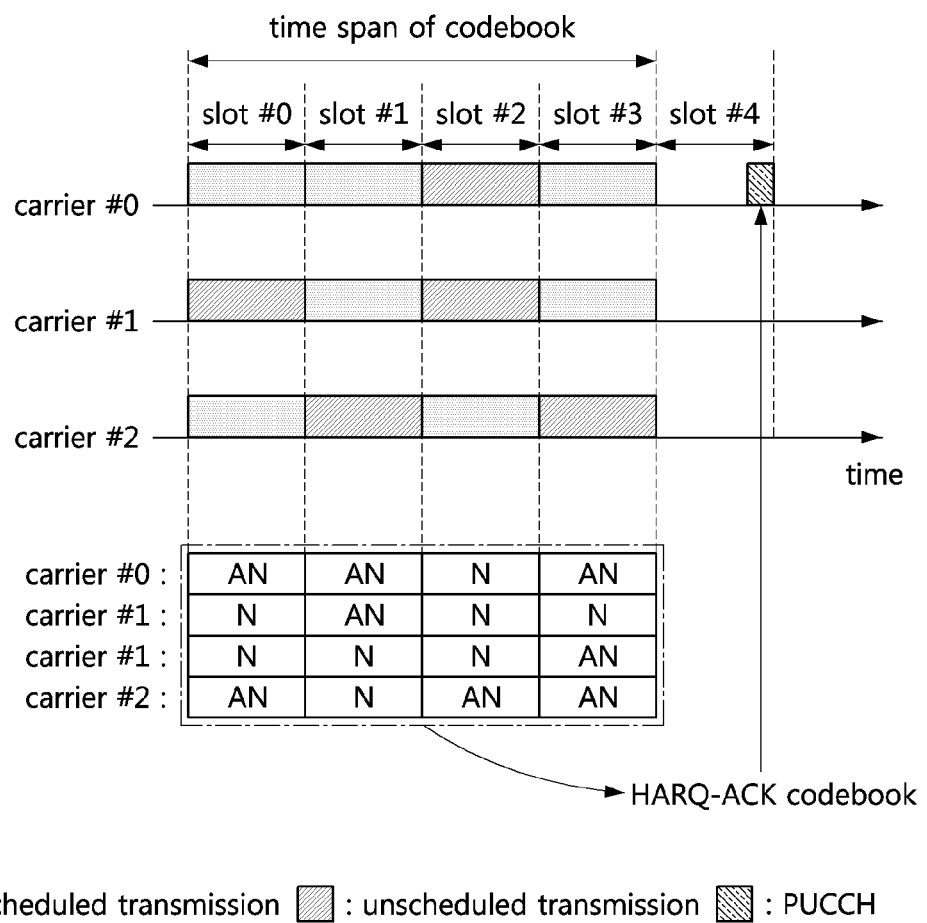
FIG. 8 is a sequence chart illustrating a first exemplary embodiment of a method for transmitting a HARQ-ACK codebook.

FIG. 8 is a sequence chart illustrating a first exemplary embodiment of a method for transmitting a HARQ-ACK codebook. As shown in FIG. 8, a transmission interval (e.g., time span of a codebook) may include 4 slots, and communication may be performed using three carriers in the transmission interval. Carriers #0 and #1 may be used for downlink communication, and a carrier #2 may be used for sidelink communication. One TB (or one CBG) may be transmitted in the carriers #0 and #2, respectively, and two TBs (or two CBGs) may be transmitted in the carrier #1. Scheduled transmissions may be transmissions scheduled by semi-static signaling or dynamic signaling.

Unscheduled resources may be resources which are not scheduled. In other words, a specific resource may not be used for transmission and reception of data, and in this case, the specific resource may not be scheduled. Since data is not transmitted in an unscheduled resource, the terminal may not receive data in the unscheduled resource, and thus, the terminal may transmit NACK. For configuration of the HARQ-ACK codebook, NACK for the unscheduled resource may be generated. Alternatively, the unscheduled resource may be a resource scheduled by scheduling information (e.g., scheduling information included in DCI or SCI) that the terminal has not received. Particularly, since scheduling information is not received, the terminal may not receive data, and accordingly, the terminal may transmit NACK. In responses to receiving the NACK, the base station may determine that the reception of scheduling information or reception of data has failed, and may perform a data retransmission procedure.

In the HARQ-ACK codebook, each of AN and N may be an HIB. Each HIB may be an HARQ response for one TB (or one CBG) received via one carrier in one slot. In the HARQ-ACK codebook, the AN may indicate ACK or NACK according to the ACK/NACK feedback scheme, and N may indicate NACK for an unscheduled resource. Alternatively, N may indicate NACK according to the ACK/NACK feedback scheme or HARQ response (e.g., NACK) according to the NACK-only feedback scheme. When SCI including scheduling information is not received, N may be NACK according to the ACK/NACK feedback scheme.

Referring to FIGS. 7 and 8 together, the carriers #0 and #1 may be used for downlink communication between the base station and the first terminal, and the carrier #2 is used for sidelink communication between the first terminal and the second terminal. The first terminal may generate the HARQ-ACK codebook including DL HARQ response(s) and SL HARQ response(s), and transmit the generated HARQ-ACK codebook to the base station via a PUCCH (e.g., PUCCH configured in the carrier #0 within a slot #4). The PUCCH may be configured by semi-static scheduling or dynamic scheduling.

Transmission timing information (e.g., PUCCH resource information) of the HARQ-ACK codebook may be indicated by one or a combination of two or more of higher layer signaling, MAC signaling, and PHY signaling. The transmission timing information of the HARQ-ACK codebook may be a time offset between a reception time of scheduling information (e.g., DCI or SCI including the scheduling information) of the sidelink communication and a start time of the PUCCH resource. When a transmission time unit of data is a slot, one HARQ-ACK codebook may include 16 HIBs.

Figure 9:
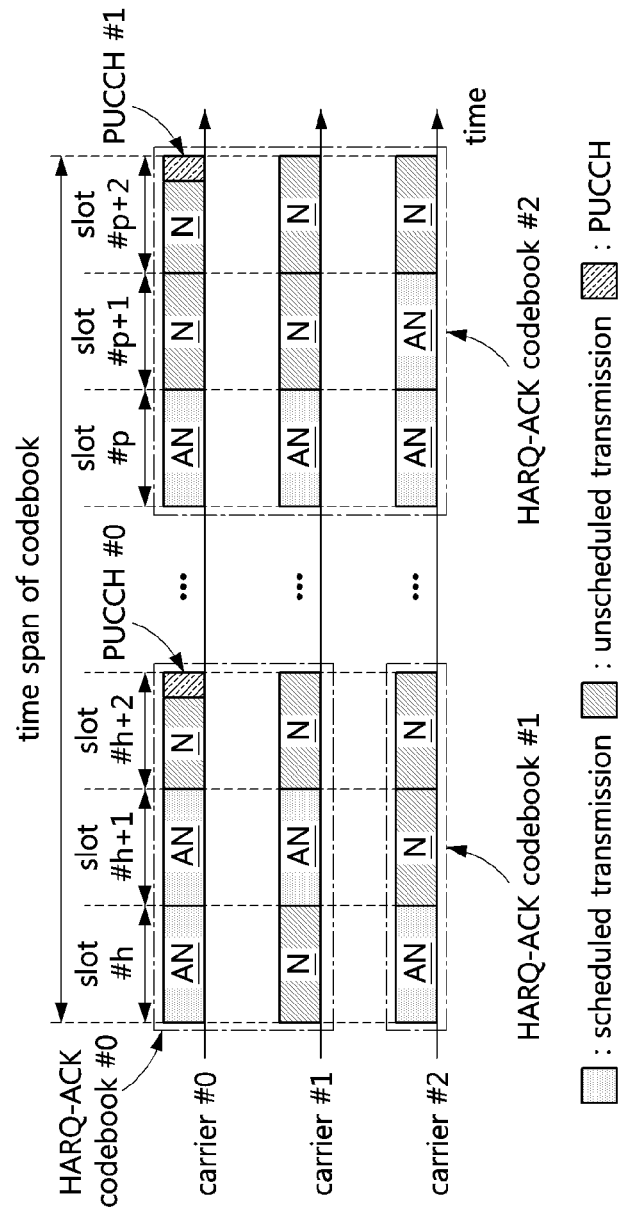
FIG. 9 is a sequence chart illustrating a second exemplary embodiment of a method for transmitting a HARQ-ACK codebook.

FIG. 9 is a sequence chart illustrating a second exemplary embodiment of a method for transmitting a HARQ-ACK codebook. As shown in FIG. 9, a transmission interval may include 3 slots, and communication may be performed using three carriers in a transmission interval. Each of h and p may be a natural number. Carriers #0 and #1 may be used for downlink communication, and a carrier #2 may be used for sidelink communication. One TB (or one CBG) may be transmitted in each of the carriers. In an HARQ-ACK codebook, each of AN and N may be an HIB. Each HIB may be an HARQ response for one TB (or one CBG) received through one carrier in one slot.

Referring to FIGS. 7 and 9 together, the carriers #0 and #1 may be used for downlink communication between the base station and the first terminal, and the carrier #2 may be used for sidelink communication between the first terminal and the second terminal. The first terminal may not transmit an HARQ-ACK codebook #1 through a PUCCH #0. For example, when a reception time of the HARQ-ACK codebook #1 (i.e., reception time of the SL HARQ response in the step S704) is after the PUCCH #0, the first terminal may not transmit the HARQ-ACK codebook #1 through the PUCCH #0. In particular, the first terminal may transmit an HARQ-ACK codebook #0 (e.g., DL HARQ response) to the base station through the PUCCH #0, and may transmit an HARQ-ACK codebook composed of the HARQ-ACK codebook #1 and an HARQ-ACK codebook #2 to the base station via a PUCCH #1. In other words, the HARQ-ACK codebook #1 may be multiplexed with the HARQ-ACK codebook #2 in the PUCCH #1. The multiplexing operation between HARQ-ACK codebooks may be performed according to a preconfigured scheme.

When a value of AN is 1 and a value of N is 0, the HARQ-ACK codebook transmitted through the PUCCH #1 may be configured as shown in Table 4 below. The matrix of Table 4 may be converted into a bit string, and the bit string may be transmitted as the HARQ-ACK codebook. In Table 4, the first row may be the HARQ-ACK codebook #1, and the second to fourth rows may be the HARQ-ACK codebook #2.

TABLE 4

| | | |
|---|---|---|
| 1 | 0 | 0 |
| 1 | 0 | 0 |
| 1 | 0 | 0 |
| 1 | 1 | 0 |

Figure 10:
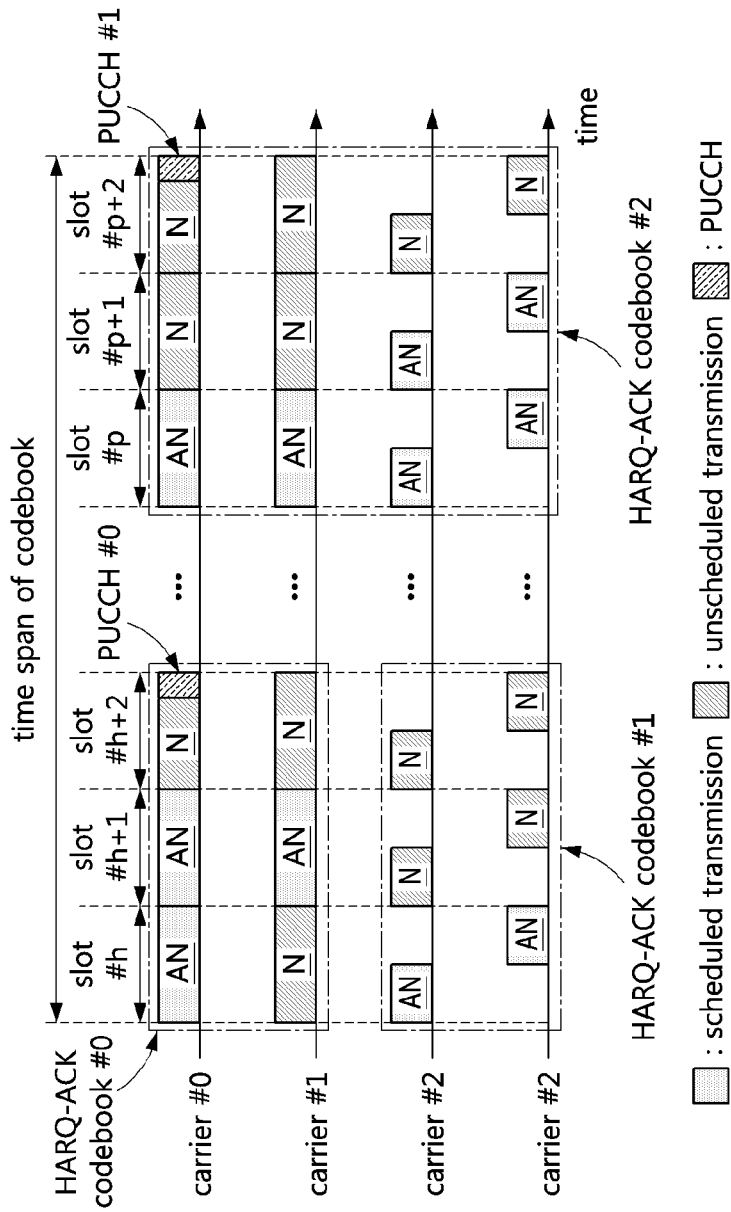
FIG. 10 is a sequence chart illustrating a third exemplary embodiment of a method for transmitting a HARQ-ACK codebook.

FIG. 10 is a sequence chart illustrating a third exemplary embodiment of a method for transmitting a HARQ-ACK codebook. As shown in FIG. 10, a transmission interval may include 3 slots, and communication may be performed using three carriers in a transmission interval. Each of h and p may be a natural number. Carriers #0 and #1 may be used for downlink communication, and a carrier #2 may be used for sidelink communication. In the carriers #0 and #1, a TB (or CBG) may be transmitted on a slot basis, and in the carrier #2, a TB (or CBG) may be transmitted on a mini-slot basis. The length of the mini-slot may be shorter than the length of the slot. One slot may include two mini-slots. In an HARQ-ACK codebook, each of AN and N may be an HIB. Each HIB may be an HARQ response for one TB (or one CBG) received through one carrier in one slot or one mini-slot.

Referring to FIGS. 7 and 10 together, the carriers #0 and #1 may be used for downlink communication between the base station and the first terminal, and the carrier #2 may be used for sidelink communication between the first terminal and the second terminal. The first terminal may not transmit an HARQ-ACK codebook #1 via a PUCCH #0. For example, when a reception time of the HARQ-ACK codebook #1 (i.e., reception time of the SL HARQ response in the step S704) is after the PUCCH #0, the first terminal may not transmit the HARQ-ACK codebook #1 via the PUCCH #0. In particular, the first terminal may transmit an HARQ-ACK codebook #0 (e.g., DL HARQ response) to the base station via the PUCCH #0, and may transmit an HARQ-ACK codebook composed of the HARQ-ACK codebook #1 and a HARQ-ACK codebook #2 to the base station via a PUCCH #1. The HARQ-ACK codebook #1 may be multiplexed with the HARQ-ACK codebook #2 in the PUCCH #1. The multiplexing operation between HARQ-ACK codebooks may be performed according to a preconfigured scheme.

When a value of AN is 1 and a value of N is 0, the HARQ-ACK codebook transmitted through the PUCCH #1 may be configured as shown in Table 5 below. The matrix of Table 5 may be converted into a bit string, and the bit string may be transmitted as the HARQ-ACK codebook. In Table 5, the first and second rows may be the HARQ-ACK codebook #1, and the third to sixth rows may be the HARQ-ACK codebook #2.

TABLE 5

| | | |
|---|---|---|
| 1 | 0 | 0 |
| 1 | 0 | 0 |
| 1 | 0 | 0 |
| 1 | 0 | 0 |
| 1 | 1 | 0 |
| 1 | 1 | 0 |

When the sidelink communication is performed on a mini-slot basis, the HARQ-ACK codebook #1 may be expanded to a 2×3 matrix, and the SL HARQ-ACK codebook in the HARQ-ACK codebook #2 may be expanded to a 2×3 matrix. When the HARQ-ACK codebook #1 and HARQ-ACK codebook #2 are multiplexed, an HARQ-ACK codebook may be generated as a 6×3 matrix. In other words, the HARQ-ACK codebook defined in Table 5 (e.g., HARQ-ACK codebook configured as the 6×3 matrix) may include the HARQ-ACK codebook #1 configured as the 2×3 matrix and the HARQ-ACK codebook #2 configured as the 4×3 matrix. In the exemplary embodiment shown in FIG. 8, when the sidelink communication is performed on a mini-slot basis, the HARQ-ACK codebook may be expanded as in the exemplary embodiment shown in FIG. 10.

In the exemplary embodiments shown in FIGS. 8 to 10, the HARQ-ACK codebook may be the type-1 HARQ-ACK codebook. In the following exemplary embodiments, methods of transmitting the type-2 HARQ-ACK codebook will be described. When the type-2 HARQ-ACK codebook is used, NACK for unscheduled resources may not be transmitted. Accordingly, the number of HARQ information bits constituting the type-2 HARQ-ACK codebook may be smaller than the number of HARQ information bits constituting the type-1 HARQ-ACK codebook. In other words, a transmission overhead of the type-2 HARQ-ACK codebook may be smaller than a transmission overhead of the type-1 HARQ-ACK codebook.

Figure 11:
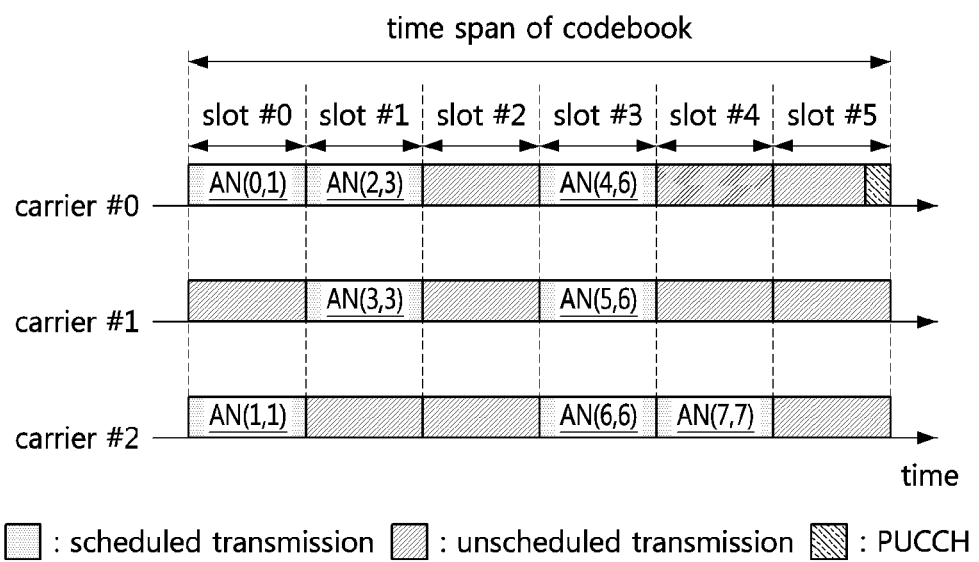
FIG. 11 is a sequence chart illustrating a fourth exemplary embodiment of a method for transmitting a HARQ-ACK codebook.

FIG. 11 is a sequence chart illustrating a fourth exemplary embodiment of a method for transmitting a HARQ-ACK codebook. As shown in FIG. 11, communication may be performed using three carriers. Carriers #0 and #1 may be used for downlink communication, and a carrier #2 may be used for sidelink communication. One TB (or one CBG) may be transmitted in each of the carriers. In an HARQ-ACK codebook, AN may be an HIB. Each HIB may be an HARQ response for one TB (or one CBG) received via one carrier in one slot.

When the type-2 HARQ-ACK codebook is used, to identify data (e.g., PDSCH or PSSCH) for which the HARQ information bit indicates ACK/NACK, a counter downlink assignment index (cDAI) and/or a total downlink assignment index (tDAI) may be used. The cDAI and tDAI may be included in control information (e.g., DCI, SCI). In (x,y) shown in FIG. 11, x may be the cDAI and y may be the tDAI. The cDAI and tDAI may be set in consideration of not only a downlink TB (e.g., PDSCH) but also a sidelink TB (e.g., PSSCH).

The index of the TB transmitted via the carrier #0 in a slot #0 may be 0, and the index of the TB transmitted via the carrier #2 in the slot #0 may be 1. The cDAI may be increased by 1. The tDAI may be set in units of a slot. The tDAI may be set as the largest index among indexes of TBs transmitted in the corresponding slot. In other words, the tDAI may be set as the maximum value of the cDAI in the corresponding slot. In the slot #0, the tDAI may be set to 1, and in the slot #1, the tDAI may be set to 3. The tDAI may be used to indicate the total number of downlink assignments from the first slot to the current slot in the transmission interval. The HARQ-ACK codebook may include 8 HARQ response bits, and may be transmitted through a PUCCH.

Figure 12:
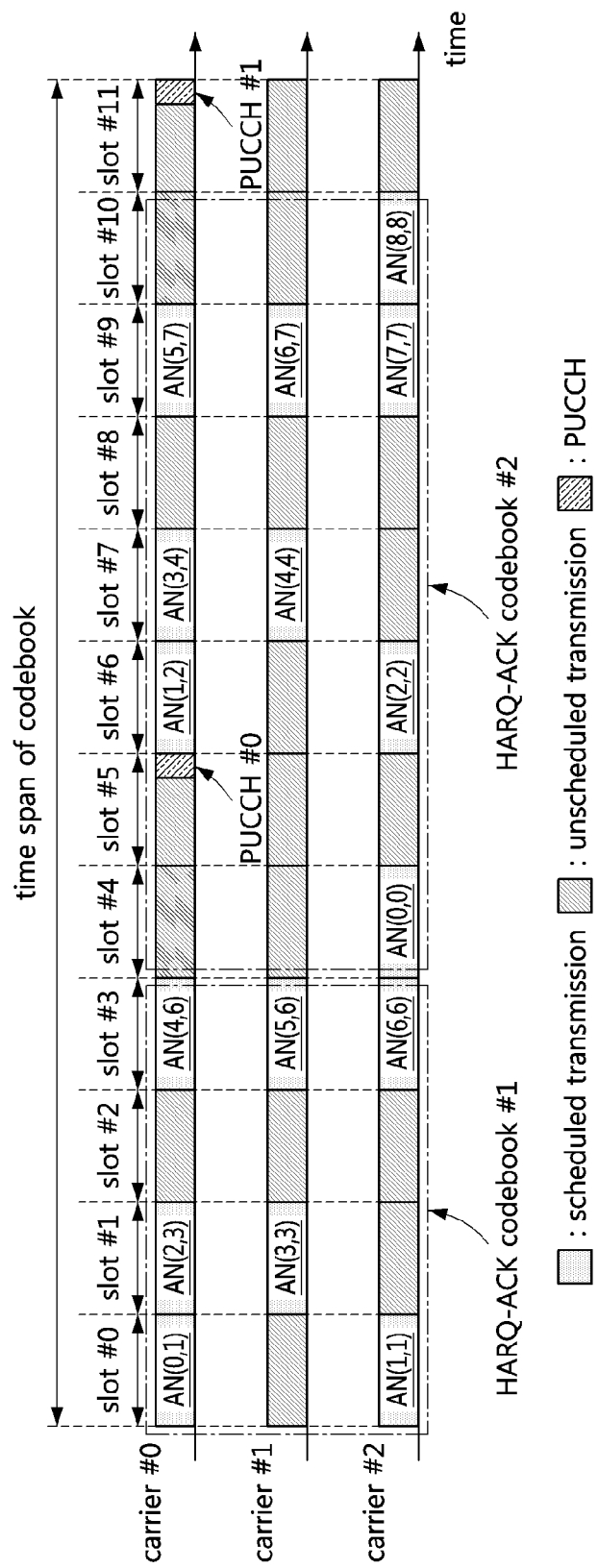
FIG. 12 is a sequence chart illustrating a fifth exemplary embodiment of a method for transmitting a HARQ-ACK codebook.

FIG. 12 is a sequence chart illustrating a fifth exemplary embodiment of a method for transmitting a HARQ-ACK codebook. As shown in FIG. 12, communication may be performed using three carriers. Carriers #0 and #1 may be used for downlink communication, and a carrier #2 may be used for sidelink communication. One TB (or one CBG) may be transmitted on each of the carriers. In an HARQ-ACK codebook, AN may be an HIB. Each HIB may be an HARQ response for one TB (or one CBG) received via one carrier in one slot.

Referring to FIGS. 7 and 12 together, the base station may transmit a DCI including (cDAI, tDAI) to the first terminal. The first terminal may generate HARQ-ACK codebooks #1 and #2 based on (cDAI, tDAI) included in the DCI, transmit the HARQ-ACK codebook #1 to the base station through a PUCCH #0, and transmit the HARQ-ACK codebook #2 to the base station through a PUCCH #1. The HARQ-ACK codebook #1 may include AN(0,1), AN(1,1), AN(2,3), AN(3,3), AN(4,6), AN(5,6), and AN(6,6). In other words, the HARQ-ACK codebook #1 may include 7 HARQ information bits. The HARQ-ACK codebook #2 may include AN(0,0), AN(1,2), AN(2,2), AN(3,4), AN(4,4), AN(5,7), AN(6,7), AN(7,7), and AN(8,8). The HARQ-ACK codebook #2 may include 9 HARQ information bits.

In particular, an SL HARQ response to a TB (or CBG) transmitted via the carrier #2 in a slot #4 may not be received from the second terminal before the PUCCH #0. The first terminal may not generate the HARQ-ACK codebook #1 including the corresponding SL HARQ response. The base station may know that the SL HARQ response for the TB (or CBG) transmitted through the carrier #2 in the slot #4 is not transmitted via the PUCCH #0. Accordingly, the base station may set (cDAI, tDAI) for the TB (or CBG) transmitted via the carrier #2 in the slot #4 to (0,0). The cDAI and tDAI may be counted from the TB (or CBG) transmitted via the carrier #2 in the slot #4. That is, the SL HARQ response for the TB (or CBG) transmitted via the carrier #2 in the slot #4 may be transmitted via the PUCCH #1 instead of the PUCCH #0.

Figure 13:
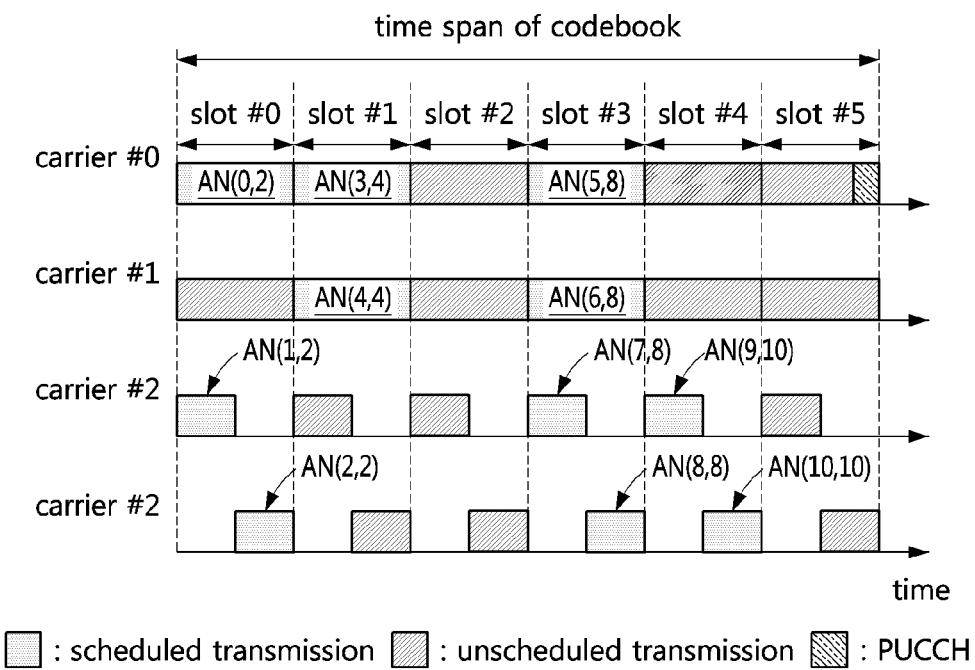
FIG. 13 is a sequence chart illustrating a sixth exemplary embodiment of a method for transmitting a HARQ-ACK codebook.

FIG. 13 is a sequence chart illustrating a sixth exemplary embodiment of a method for transmitting a HARQ-ACK codebook. Referring to FIG. 13, communication may be performed using three carriers. Carriers #0 and #1 may be used for downlink communication, and a carrier #2 may be used for sidelink communication. Downlink communication may be performed on a slot basis, and sidelink communication may be performed on a mini-slot basis. One slot may include two mini-slots. (cDAI, tDAI) may be set in consideration of slots and mini-slots. For example, (cDAI, tDAI) for a TB (or CBG) transmitted vi the carrier #0 in a slot #0 may be set to (0,2), and (cDAI, tDAI) for a TB (or CBG) transmitted via the carrier #2 in the slot #0 may be set to (1,2) and (2,2), respectively. Accordingly, an HARQ-ACK codebook including AN(0,2), AN(1,2), AN(2,2), AN(3,4), AN(4,4), AN(5,8), AN(6,8), AN(7,8), AN(8,8), AN(9,10), and AN(10,10) may be generated, and the HARQ-ACK codebook may be transmitted to the base station via a PUCCH.

The exemplary embodiments of the present disclosure may be implemented as program instructions executable by a variety of computers and recorded on a non-transitory computer readable medium. The computer readable medium may include a program instruction, a data file, a data structure, or a combination thereof. The program instructions recorded on the non-transitory computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, the operation method comprising:
receiving, from a base station, configuration information including a first information element indicating a type of a hybrid automatic repeat request-acknowledgement (HARQ-ACK) codebook;
generating the HARQ-ACK codebook including a downlink (DL) HARQ information bit for downlink communication between the base station and the first terminal and a sidelink (SL) HARQ information bit for sidelink communication between the first terminal and a second terminal; and
transmitting, to the base station, the HARQ-ACK codebook using an uplink channel,
wherein the HARQ-ACK codebook transmitted to the base station has the type indicated by the first information element.

2. The operation method according to claim 1, wherein the type indicated by the first information element is a type of an HARQ-ACK codebook for the downlink communication, and a type of an HARQ-ACK codebook for the sidelink communication is considered to be equal to the type indicated by the first information element.

3. The operation method according to claim 1, wherein the DL HARQ information bit is an HARQ response for DL data transmitted through a first carrier, and the SL HARQ information bit is an HARQ response for SL data transmitted through a second carrier.

4. The operation method according to claim 1, wherein a transmission time unit of DL data related to the DL HARQ information bit is different from a transmission time unit of SL data related to the SL HARQ information bit.

5. The operation method according to claim 1, wherein the configuration information further includes a second information element indicating whether the SL HARQ information bit is multiplexed in the uplink channel.

6. The operation method according to claim 1, wherein the configuration information further includes a third information element indicating an HARQ feedback scheme.

7. The operation method according to claim 1, wherein the uplink channel is a physical uplink control channel (PUCCH) or a physical uplink shared channel (PUSCH).

8. The operation method according to claim 1, wherein the HARQ-ACK codebook is generated in units of a transmission interval composed of a plurality of slots, and the HARQ-ACK codebook includes a first DL HARQ information bit for first DL data received through a first carrier in a first slot among the plurality of slots, a first SL HARQ information bit for first SL data transmitted through a second carrier in the first slot, a second DL HARQ information bit for second DL data received through the first carrier in a second slot among the plurality of slots, and a second SL HARQ information bit for second SL data transmitted through the second carrier in the second slot.

9. An operation method of a base station in a communication system, the operation method comprising:
transmitting, to a first terminal, configuration information including a first information element indicating a type of a hybrid automatic repeat request-acknowledgement (HARQ-ACK) codebook;
transmitting, to the first terminal, at least one downlink (DL) data through a downlink channel; and
receiving, from the first terminal, the HARQ-ACK codebook including at least one DL HARQ information bit for the at least one DL data and at least one sidelink (SL) HARQ information bit for sidelink communication between the first terminal and a second terminal through an uplink channel,
wherein the HARQ-ACK codebook received from the first terminal has the type indicated by the first information element, and the type is classified into a semi-static type and a dynamic type.

10. The operation method according to claim 9, wherein the type indicated by the first information element is a type of an HARQ-ACK codebook for downlink communication between the base station and the first terminal, and a type of an HARQ-ACK codebook for the sidelink communication is considered to be equal to the type indicated by the first information element.

11. The operation method according to claim 9, wherein the at least one DL data is transmitted to the first terminal through a first carrier, and at least one SL data related to the at least one SL HARQ information bit is transmitted from the first terminal to the second terminal through a second carrier.

12. The operation method according to claim 9, wherein the configuration information further includes a second information element indicating whether the at least one SL HARQ information bit is multiplexed in the uplink channel.

13. The operation method according to claim 9, wherein the configuration information further includes a third information element indicating an HARQ feedback scheme.

14. The operation method according to claim 9, wherein the uplink channel is a physical uplink control channel (PUCCH) or a physical uplink shared channel (PUSCH).

15. The operation method according to claim 9, wherein the HARQ-ACK codebook is generated in units of a transmission interval composed of a plurality of slots, and the HARQ-ACK codebook includes a first DL HARQ information bit for first DL data transmitted through a first carrier in a first slot among the plurality of slots, a first SL HARQ information bit for first SL data transmitted through a second carrier in the first slot, a second DL HARQ information bit for second DL data transmitted through the first carrier in a second slot among the plurality of slots, and a second DL HARQ information bit for second DL data transmitted through the second carrier in the second slot.

16. A first terminal in a communication system, the first terminal comprising:
a processor; and
a memory storing at least one instruction executed by the processor,
wherein when executed by the processor, the at least one instruction causes the first terminal to:
receive, from a base station, configuration information including a first information element indicating a type of a hybrid automatic repeat request-acknowledgement (HARQ-ACK) codebook;
generate the HARQ-ACK codebook including at least one downlink (DL) HARQ information bit for downlink communication between the base station and the first terminal and at least one sidelink (SL) HARQ information bit for sidelink communication between the first terminal and a second terminal; and
transmit, to the base station, the HARQ-ACK codebook using an uplink channel,
wherein the HARQ-ACK codebook transmitted to the base station has the type indicated by the first information element, and the type is classified into a semi-static type and a dynamic type.

17. The first terminal according to claim 16, wherein the type indicated by the first information element is a type of an HARQ-ACK codebook for downlink communication between the base station and the first terminal, and a type of an HARQ-ACK codebook for the sidelink communication is considered to be equal to the type indicated by the first information element.

18. The first terminal according to claim 16, wherein the at least one DL HARQ information bit is at least one HARQ response for at least one DL data transmitted through a first carrier, and the at least one SL HARQ information bit is at least one HARQ response for at least one SL data transmitted through a second carrier.

19. The first terminal according to claim 16, wherein the configuration information further includes a second information element indicating whether the at least one SL HARQ information bit is multiplexed in the uplink channel and a third information element indicating an HARQ feedback scheme, the third information element set to a first value indicates that a negative ACK (NACK)-only feedback scheme is used, and the third information element set to a second value indicates that an ACK/NACK feedback scheme is used.

20. The first terminal according to claim 16, wherein the HARQ-ACK codebook is generated in units of a transmission interval composed of a plurality of slots, and the HARQ-ACK codebook includes a first DL HARQ information bit for first DL data received through a first carrier in a first slot among the plurality of slots, a first SL HARQ information bit for first SL data transmitted through a second carrier in the first slot, a second DL HARQ information bit for second DL data received through the first carrier in a second slot among the plurality of slots, and a second SL HARQ information bit for second SL data transmitted through the second carrier in the second slot.

* * * * *